United States Patent
Mimura et al.

(10) Patent No.: US 11,541,906 B2
(45) Date of Patent: Jan. 3, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yoshitaka Mimura, Wako (JP); Yasushi Shoda, Wako (JP); Junpei Noguchi, Wako (JP); Yuki Hara, Wako (JP); Hiroshi Yamanaka, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 16/798,497

(22) Filed: Feb. 24, 2020

(65) Prior Publication Data

US 2020/0283020 A1  Sep. 10, 2020

(30) Foreign Application Priority Data

Mar. 4, 2019  (JP) .............................. JP2019-038538

(51) Int. Cl.
*B60W 60/00* (2020.01)
*B60W 50/00* (2006.01)
(Continued)

(52) U.S. Cl.
CPC ........ *B60W 60/0013* (2020.02); *B60W 10/20* (2013.01); *B60W 40/08* (2013.01);
(Continued)

(58) Field of Classification Search
CPC ......... B60W 60/0013; B60W 50/0098; B60W 40/08; B60W 10/20; B60W 60/00253;
(Continued)

(56) References Cited

U.S. PATENT DOCUMENTS

2011/0119626 A1*  5/2011  Faenger ............. H04N 21/4825
                                                    715/811
2016/0075233 A1*  3/2016  Chun .................... B60K 35/00
                                                    701/36
(Continued)

FOREIGN PATENT DOCUMENTS

JP  02-198047  8/1990
JP  09-109804  4/1997
(Continued)

OTHER PUBLICATIONS

Translation of Takahiro (JP 2018154141 A) (Year: 2018).*
(Continued)

*Primary Examiner* — James J Lee
*Assistant Examiner* — Alexander George Matta
(74) *Attorney, Agent, or Firm* — Amin, Turocy & Watson, LLP (57) ABSTRACT

A vehicle control system includes a recognizer configured to recognize a surrounding situation of a vehicle, a driving controller configured to perform driving control on at least one of steering and a speed of the vehicle on the basis of a recognition result of the recognizer, an environment controller configured to control an operation of a predetermined device for providing a comfortable environment of the vehicle and limit an operation state of the predetermined device at a timing when a user gets out of the vehicle, and a reproducer configured to reproduce the operation state of the predetermined device at a timing when the user gets into the vehicle when the driving controller performs driving control for moving the vehicle from a parking area and picking up the user.

8 Claims, 7 Drawing Sheets

(51) Int. Cl.
   *G06V 20/56* (2022.01)
   *B60W 40/08* (2012.01)
   *B60W 10/20* (2006.01)

(52) U.S. Cl.
   CPC .. *B60W 50/0098* (2013.01); *B60W 60/00253* (2020.02); *G06V 20/56* (2022.01); *B60W 2050/0075* (2013.01); *B60W 2556/10* (2020.02)

(58) Field of Classification Search
   CPC ......... B60W 2050/0089; B60W 50/08; B60W 2050/0075; B60W 2556/10; G06K 9/00791; G06K 9/00812; B62D 15/0285; G06V 20/56; G06V 20/586
   See application file for complete search history.

(56) References Cited

U.S. PATENT DOCUMENTS

| | | | | |
|---|---|---|---|---|
| 2016/0098992 | A1* | 4/2016 | Renard | G10L 15/30 704/275 |
| 2017/0372189 | A1* | 12/2017 | Joo | B60W 50/0098 |
| 2018/0265094 | A1* | 9/2018 | Graney | B60K 35/00 |
| 2018/0342157 | A1* | 11/2018 | Donnelly | B60R 16/037 |
| 2019/0243368 | A1* | 8/2019 | Seki | G05D 1/0221 |
| 2020/0007943 | A1* | 1/2020 | Filmeyer | G06F 16/745 |
| 2022/0036381 | A1* | 2/2022 | Nakayama | G06F 21/62 |

FOREIGN PATENT DOCUMENTS

| | | |
|---|---|---|
| JP | 2009-205737 | 9/2009 |
| JP | 2015-219811 | 12/2015 |
| JP | 2017-073125 | 4/2017 |
| JP | 2017-211539 | 11/2017 |
| JP | 2017-538618 | 12/2017 |
| JP | 2018-060192 | 4/2018 |
| JP | 2018-060248 | 4/2018 |
| JP | 2018-154141 | 10/2018 |
| JP | 2018154141 A * | 10/2018 |
| JP | 2018-169494 | 11/2018 |
| WO | 2018/025668 | 2/2018 |

OTHER PUBLICATIONS

Japanese Office Action for Japanese Patent Application No. 2019-038538 dated Apr. 5, 2022.
Japanese Notice of Allowance for Japanese Patent Application No. 2019-038538 dated Sep. 6, 2022.

* cited by examiner

| FUNCTION | REPRODUCTION | STATE WHEN DOOR IS OPENED (CONTROL DETAILS) |
|---|---|---|
| INTERIOR LIGHT ILLUMINATION DEVICE | DON'T DO | - |
| WIPER CONTROL DEVICE | DON'T DO | - |
| AIR CONDITIONING DEVICE | DO | SET TEMPERATURE, SET AIR VOLUME, ⋯ |
| MUSIC PLAYBACK DEVICE | DO | PLAYBACK FROM BEGINNING OF SONG |
| VIDEO PLAYBACK DEVICE | DO | PLAYBACK FROM STOP POSITION |
| AGENT DEVICE | DO | TAKEOVER OF UTTERANCE DETAILS |
| ⋯ | ⋯ | ⋯ |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-038538, filed Mar. 4, 2019, the content of which is incorporated herein by reference.

BACKGROUND

Field of the Invention

The present invention relates to a vehicle control device, a vehicle control method, and a storage medium.

Description of Related Art

Conventionally, research has been conducted on automatically controlling a vehicle. In connection with this, technology for reducing power consumption by stopping a function of a device that is not related to traveling when a vehicle travels (for example, an air conditioning device) in a situation where a user is not in the vehicle has been disclosed (for example, Japanese Unexamined Patent Application, First Publication No. 2018-154141).

SUMMARY

However, in the conventional technology, a user may be dissatisfied because a function stopped when he/she got out of a vehicle remains in a stopped state if he/she gets into a vehicle again after the function was stopped when he/she got out of the vehicle.

Aspects of the present invention have been made in view of such circumstances, and an objective of the present invention is to provide a vehicle control system, a vehicle control method, and a storage medium capable of improving the satisfaction of a user.

A vehicle control system, a vehicle control method, and a storage medium according to the present invention adopt the following configurations.

(1): According to an aspect of the present invention, there is provided a vehicle control system including: a recognizer configured to recognize a surrounding situation of a vehicle; a driving controller configured to control at least one of steering and a speed of the vehicle on the basis of a recognition result of the recognizer; an environment controller configured to control an operation of a predetermined device for providing a comfortable environment of the vehicle and limit an operation state of the predetermined device at a timing when a user gets out of the vehicle; and a reproducer configured to reproduce the operation state of the predetermined device at a timing when the user gets into the vehicle when the driving controller performs driving control for moving the vehicle from a parking area and picking up the user.

(2): In the above-described aspect (1), the vehicle control system further includes an acquirer configured to acquire the recognition result indicating that the user gets into the vehicle from the recognizer, wherein, when the acquirer has acquired the recognition result indicating that the user gets into the vehicle, the reproducer determines that the driving controller performs a process of moving the vehicle from a parking area and picking up the user and instructs the environment controller to reproduce the operation state of the predetermined device at the timing when the user gets into the vehicle.

(3): In the above-described aspect (1), the reproducer reproduces the operation state of the predetermined device used by the user while the user was in the vehicle.

(4): In the above-described aspect (3), the reproducer does not reproduce the operation state of the predetermined device which was not used by the user while the user was in the vehicle or whose use was stopped while the user was in the vehicle.

(5): In the above-described aspect (4), the predetermined device includes some or all of a content playback device, an air conditioning device, a wiper device, an illumination device, and an agent device.

(6): In the above-described aspect (5), the environment controller adjusts an operation start timing of the predetermined device so that the operation state of the predetermined device is reproduced at a timing when the recognizer recognizes that the user gets into the vehicle.

(7): In the above-described aspect (1), the predetermined device includes a content playback device, and the environment controller causes the content playback device to play content from a content stop position at an end timepoint of a previous getting-into process at a timing when a door of the vehicle is opened so that the user gets into the vehicle.

(8): In the above-described aspect (1), the predetermined device includes a content playback device, and the environment controller causes the content playback device to play content that was being played at an end timepoint of a previous getting-into process from the beginning at a timing when a door of the vehicle is opened so that the user gets into the vehicle.

(9): In the above-described aspect (8), the reproducer is able to acquire information for identifying a user and does not reproduce the operation state of the predetermined device when the user to be picked up for which the information has been acquired is different from a user getting out of the vehicle at a timing when the operation state of the predetermined device has been limited.

(10): In the above-described aspect (1), the predetermined device includes a content playback device, and the environment controller is able to select whether to cause the content playback device to play content from a content stop position at an end timepoint of a previous getting-into process, or to play content that was being played at the end timepoint of the previous getting-into process from the beginning, at a timing when a door of the vehicle is opened so that the user gets into the vehicle.

(11): In the above-described aspect (7), the environment controller resumes playback of content information from a playback position which is a predetermined period of time earlier than the stop position when the content is played from the content stop position at the end timepoint of the previous getting-into process.

(12): In the above-described aspect (1), the predetermined device includes an air conditioning device, and the environment controller adjusts an operation start timing and an operation condition of the air conditioning device so that the operation state is reached when a door of the vehicle is opened so that the user gets into the vehicle.

(13): According to an aspect of the present invention, there is provided a vehicle control method including: recognizing, by a vehicle control device, a surrounding situation of a vehicle; performing, by the vehicle control device, driving control on at least one of steering and a speed of the vehicle on the basis of a recognition result; controlling, by the vehicle control device, an operation of a predetermined device for providing a comfortable environment of the vehicle and limiting an operation state of the predetermined device at a timing when a user gets out of the vehicle; and reproducing, by the vehicle control device, the operation state of the predetermined device at a timing when the user gets into the vehicle if driving control for moving the vehicle from a parking area and picking up the user is performed.

(14): According to an aspect of the present invention, there is provided a computer-readable non-transitory storage medium storing a program for causing a vehicle control device to: recognize a surrounding situation of a vehicle; perform driving control on at least one of steering and a speed of the vehicle on the basis of a recognition result; control an operation of a predetermined device for providing a comfortable environment of the vehicle and limit an operation state of the predetermined device at a timing when a user gets out of the vehicle; and reproduce the operation state of the predetermined device at a timing when the user gets into the vehicle if driving control for moving the vehicle from a parking area and picking up the user is performed.

According to the above-described aspects (1) to (14), it is possible to improve the satisfaction of a user.

DESCRIPTION OF EMBODIMENTS

Hereinafter, embodiments of a vehicle control device, a vehicle control method, and a storage medium according to the present invention will be described with reference to the drawings.

[Overall Configuration]

Figure 1:
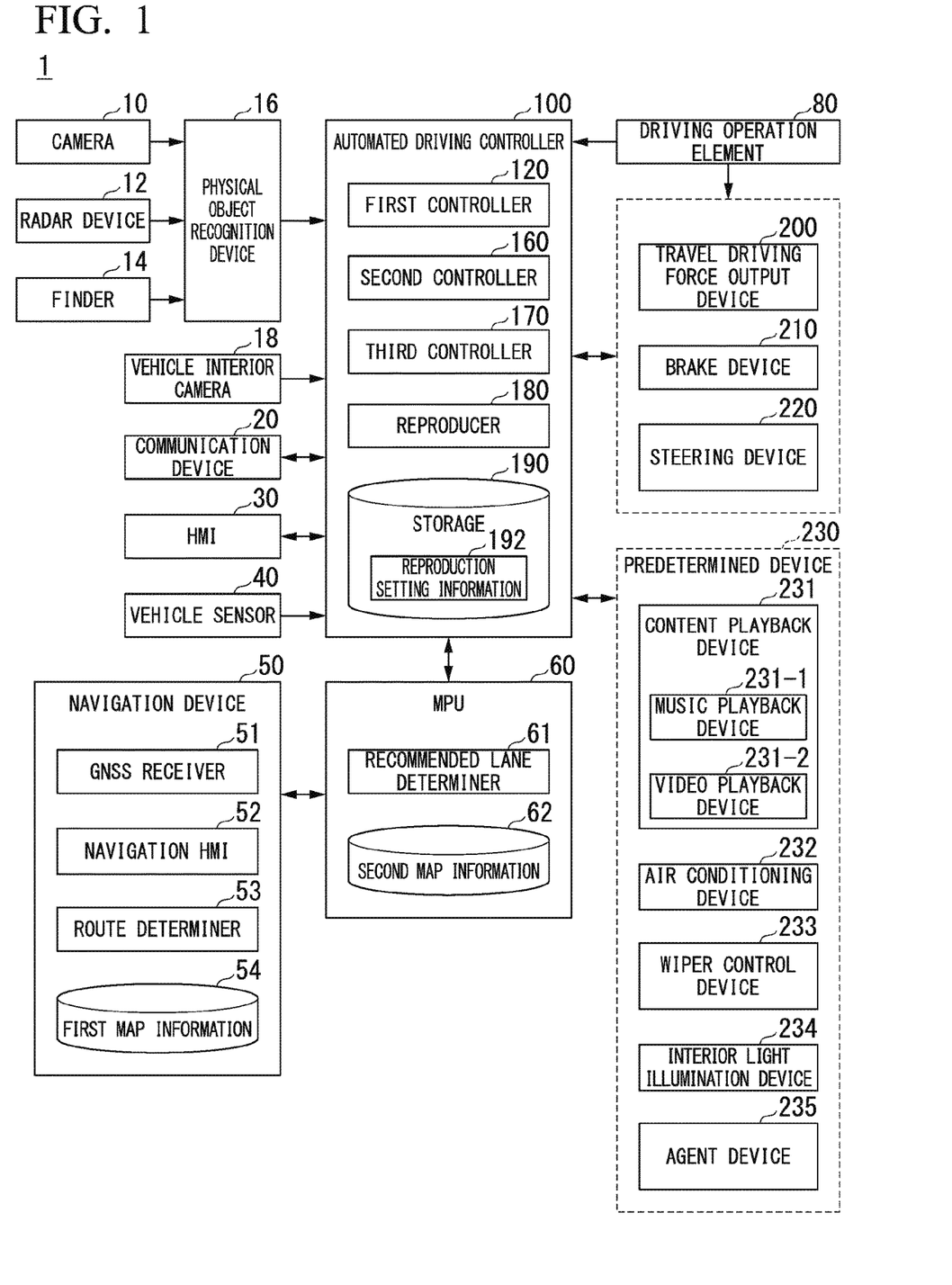
FIG. 1 is a configuration diagram of a vehicle control system according to an embodiment.

FIG. 1 is a configuration diagram of a vehicle control system 1 according to an embodiment. For example, a vehicle on which the vehicle control system 1 is mounted is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle control system 1 includes a camera 10, a radar device 12, a finder 14, a physical object recognition device 16, a vehicle interior camera 18, a communication device 20, a human machine interface (HMI) 30, a vehicle sensor 40, a navigation device 50, a map positioning unit (MPU) 60, a driving operation element 80, an automated driving controller 100, a travel driving force output device 200, a brake device 210, a steering device 220, and a predetermined device 230. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be further added. The automated driving controller 100 is an example of a "vehicle control device".

For example, the camera 10 is a digital camera using a solid-state imaging element such as a charge coupled device (CCD) or a complementary metal oxide semiconductor (CMOS). The camera 10 is attached to any position on the vehicle (hereinafter, a host vehicle M) on which the vehicle control system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving controller 100. The physical object recognition device 16 may output detection results of the camera 10, the radar device 12, and the finder 14 to the automated driving controller 100 as they are. The physical object recognition device 16 may be omitted from the vehicle control system 1.

The vehicle interior camera 18 is a digital camera using a solid-state imaging device such as a CCD or a CMOS. The vehicle interior camera 18 is attached to any position in the interior of the host vehicle M and captures an image of the interior of the host vehicle M. The vehicle interior camera 18 may be a stereo camera.

The communication device 20 communicates with another vehicle or another device existing in the vicinity of the host vehicle M using, for example, a cellular network, a Wi-Fi network, Bluetooth (registered trademark), a dedicated short range communication (DSRC), or the like.

The HMI 30 presents various types of information to an occupant of the host vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. For example, the navigation device 50 may be implemented by a function of a terminal device such as a smartphone or a tablet terminal possessed by the user. The navigation device 50 may transmit a current position and a destination to the navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels in from the left. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, or the like. The second map information 62 may include road information, traffic regulations information, address information (an address/zip code), facility information, telephone number information, and the like. The second map information 62 may be updated at any time when the communication device 20 communicates with another device.

For example, the driving operation element 80 includes an accelerator pedal, a brake pedal, a shift lever, a steering wheel, a steering wheel variant, a joystick, and other operation elements. A sensor configured to detect an amount of operation or the presence or absence of an operation is attached to the driving operation element 80, and a detection result thereof is output to the automated driving controller 100 or some or all of the travel driving force output device 200, the brake device 210, and the steering device 220.

The automated driving controller 100 includes, for example, a first controller 120, a second controller 160, a third controller 170, a reproducer 180, and a storage 190. The first controller 120 and the second controller 160 are implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the storage 190 (a storage device including a non-transitory storage medium) or pre-stored in a removable storage medium (a non-transitory storage medium) such as a DVD or a CD-ROM. The program may be installed in the HDD or the flash memory of the storage 190 when the storage medium (the non-transitory storage medium) is mounted in a drive device.

The storage 190 is implemented by, for example, an HDD, a flash memory, an electrically erasable programmable read only memory (EEPROM), a read only memory (ROM), a random access memory (RAM), or the like. The storage 190 stores, for example, a program read and executed by the processor, reproduction setting information 192, and the like. The reproduction setting information 192 will be described below.

Figure 2:
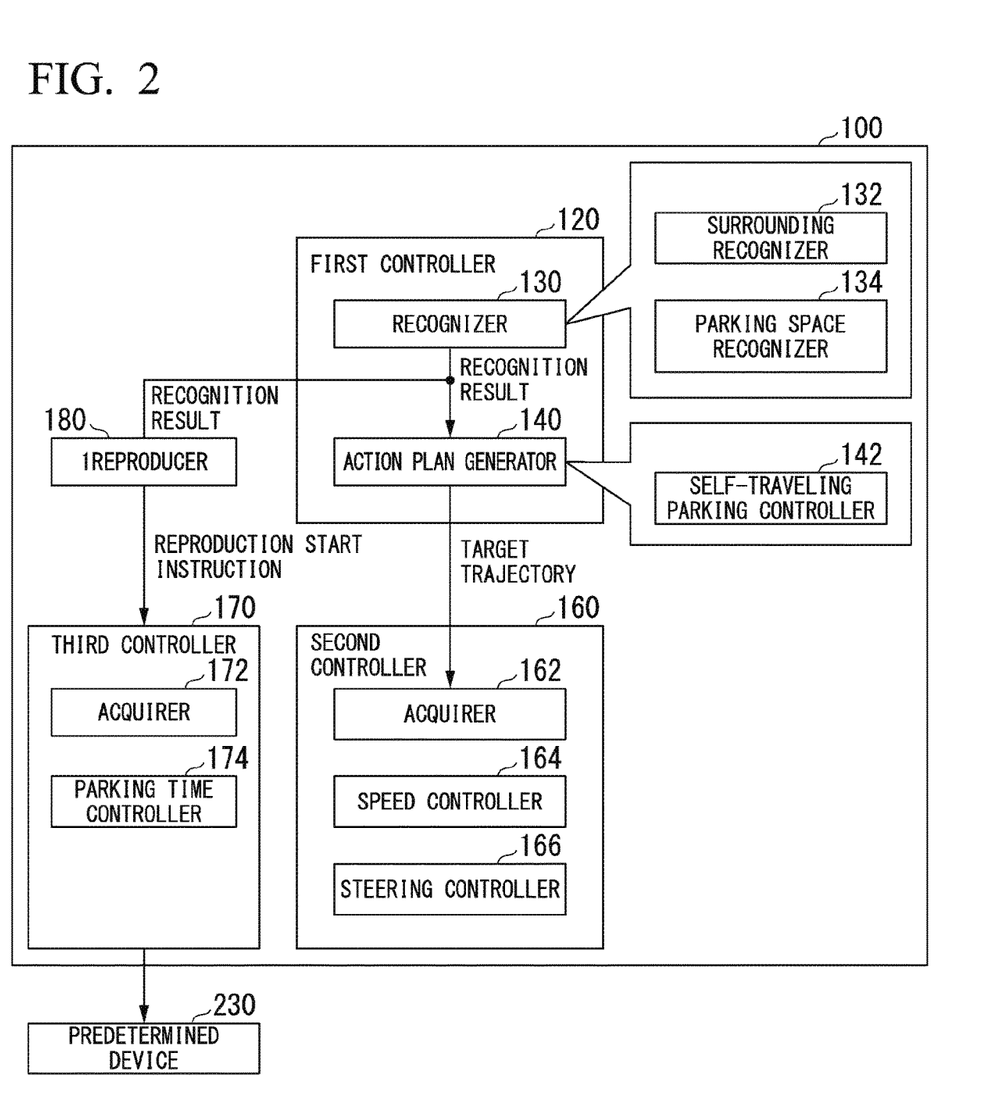
FIG. 2 is a functional configuration diagram of a first controller, a second controller, a third controller, and a reproducer.

FIG. 2 is a functional configuration diagram of the first controller 120, the second controller 160, the third controller 170, and the reproducer 180. The first controller 120 includes, for example, a recognizer 130, and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured. The first controller 120 and the second controller 160 are an example of a "driving controller".

The recognizer 130 includes a surrounding recognizer 132 and a parking space recognizer 134. The surrounding recognizer 132 recognizes a state such as a position, velocity, or acceleration of a physical object present in the vicinity of the host vehicle M on the basis of information input from the camera 10, the radar device 12, and the finder 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the surrounding recognizer 132 recognizes a lane in which the host vehicle M is traveling (a travel lane). For example, the surrounding recognizer 132 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The surrounding recognizer 132 may recognize a travel lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The surrounding recognizer 132 recognizes a temporary stop line, an obstacle, red traffic light, a toll gate, and other road events.

When the travel lane is recognized, the surrounding recognizer 132 recognizes a position or orientation of the host vehicle M with respect to the travel lane. For example, the surrounding recognizer 132 may recognize a gap of a reference point of the host vehicle M from the center of the lane and an angle formed with respect to a line connecting the center of the lane in the travel direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The surrounding recognizer 132 further recognizes a state in the interior of the vehicle (for example, a seating position of the user, the motion of the user, or vehicle interior space information such as the temperature and humidity in the interior of the vehicle) on the basis of an image captured by the vehicle interior camera 18 or a sensing result of a door sensor (not shown), a temperature/humidity sensor (not shown), or the like.

Details of the function of the parking space recognizer 134 will be described below.

The action plan generator 140 generates a future target trajectory along which the host vehicle M automatically travels (independently of a driver's operation) so that the host vehicle M can generally travel in the recommended lane determined by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory point is a point where the host vehicle M is required to reach for each predetermined traveling distance (for example, about several meters [m]) along a road. In addition, a target speed and target acceleration for each predetermined sampling time (for example, about several tenths of a second [sec]) are generated as parts of the target trajectory. The trajectory point may be a position at which the host vehicle M is required to arrive at the sampling time for each predetermined sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following traveling event, a lane change event, a branching event, a merging event, a takeover event, a self-traveling parking event for parking the vehicle according to unmanned traveling in a valet parking or the like, and the like. The valet parking refers to a form of parking of a parking lot having a parking area away from a stopping area where a getting-into/out process is performed. The action plan generator 140 generates a target trajectory according to the activated event. The action plan generator 140 includes a self-traveling parking controller 142 that is activated when the self-traveling parking event is executed. Details of the function of the self-traveling parking controller 142 will be described below.

The second controller 160 controls the travel driving force output device 200, the brake device 210, and the steering device 220 so that the host vehicle M passes through the target trajectory generated by the action plan generator 140 at a scheduled time.

The third controller 170 controls an operation of the predetermined device 230 on the basis of a reproduction start instruction from the reproducer 180 to be described below and limits the operation state of the predetermined device 230 at a timing when the user gets out of the vehicle M. The operation state of the predetermined device 230 is controlled. The third controller 170 is an example of an "environment controller".

When the first controller 120 and the second controller 160 perform driving control for moving the vehicle M from the parking area and picking up the user on the basis of the recognition result of the recognizer 130, the reproducer 180 outputs a reproduction start instruction to the third controller 170 so that the operation state of the predetermined device 230 is reproduced at a timing when the user gets into the vehicle M.

The reproducer 180 may store the operation state of the predetermined device 230 in the reproduction setting information 192 at predetermined time intervals. In this case, the reproducer 180 can acquire information for identifying the user (a user ID, a face image of the user, and the like) and an operation state of the predetermined device 230 includes information for identifying the user, a setting state or an operation result of the user, or the like.

The third controller 170 includes, for example, an acquirer 172 and a parking time controller 174. The acquirer 172 acquires a reproduction start instruction output by the reproducer 180. The acquirer 172 may acquire a recognition result of the surrounding recognizer 132 and a transmission/reception result of the communication device 20. The parking time controller 174 reproduces the operation state of the predetermined device 230 on the basis of the reproduction start instruction acquired by the acquirer 172 when the host vehicle M travels within the parking lot. The parking time controller 174 may start the reproduction of the operation state of the predetermined device 230 at the timing when the reproduction start instruction has been acquired or may adjust an amount of control for reproduction or a control timing in accordance with reproduction details of the operation state of the predetermined device 230. Detailed processing will be described below.

Returning to FIG. 2, the second controller 160 includes, for example, an acquirer 162, a speed controller 164, and a steering controller 166. The acquirer 162 acquires information of a target trajectory (a trajectory point) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a degree of curve of a target trajectory stored in the memory. For example, processes of the speed controller 164 and the steering controller 166 are implemented by a combination of feed-forward control and feedback control. As one example, the steering controller 166 executes feed-forward control according to the curvature of the road in front of the host vehicle M and feedback control based on a deviation from the target trajectory in combination.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated by an operation of the brake pedal included in the driving operation element 80 to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to cause the direction of the steerable wheels to be changed.

The predetermined device 230 is a device having a function of providing a comfortable environment for the user. The predetermined device 230 includes, for example, some or all of a content playback device 231, an air conditioning device 232, a wiper device 233, an interior light illumination device 234, and an agent device 235.

The content playback device 231 is a device that plays content information (for example, a video, music, or an electronic book) stored in a storage medium or content information (for example, from a television, from a radio, a podcast, or the like) acquired via the communication device 20. The content playback device 231 includes, for example, a music playback device 231-1 and/or a video playback device 231-2. The music playback device 231-1 is, for example, a device that plays music content information stored in a storage medium and music broadcast by radio or the like. For example, the video playback device 231-2 is a device that plays a video such as video content information stored in the storage medium. The video playback device 231-2 may play the same video for all users or may play a video for a rear seat user who is not in charge of driving and steering.

The air conditioning device 232 adjusts an environment of the interior of the vehicle by adjusting a state of the air in the interior of the vehicle. An operation of the air conditioning device 232 is controlled by, for example, an air conditioner ECU that has received an operation of the user.

The wiper device 233 includes a wiper blade (not shown), a wiper arm (not shown), a motor (not shown), and a wiper controller (not shown). The wiper blade is connected to the motor via the wiper arm. For example, the wiper blade reciprocates on the front windshield to wipe off raindrops, snow, and extraneous matters adhering to the front windshield. The wiper blade may also be provided on the rear window or the front windshield. The wiper device 233 may further include a sensor such as a rain sensor.

The interior light illumination device 234 includes an illumination light (not shown) and an illumination light controller (not shown). The illumination light illuminates the interior of the host vehicle M on the basis of control of the illumination light controller. The interior light controller controls the illumination light so that ON/OFF of irradiation light and an intensity of the illumination are adjusted. The interior light illumination device 234 may further include a sensor such as a door sensor or an illuminance sensor.

The agent device 235 is a device having a function of performing a voice conversation with the user of the host vehicle M and supporting a conversation between users (hereinafter referred to as an agent function). The agent function is implemented by a software agent (an intelligent agent) having a certain type of artificial intelligence function.

[Self-Traveling Parking Event-Time of Entering]

Figure 3:
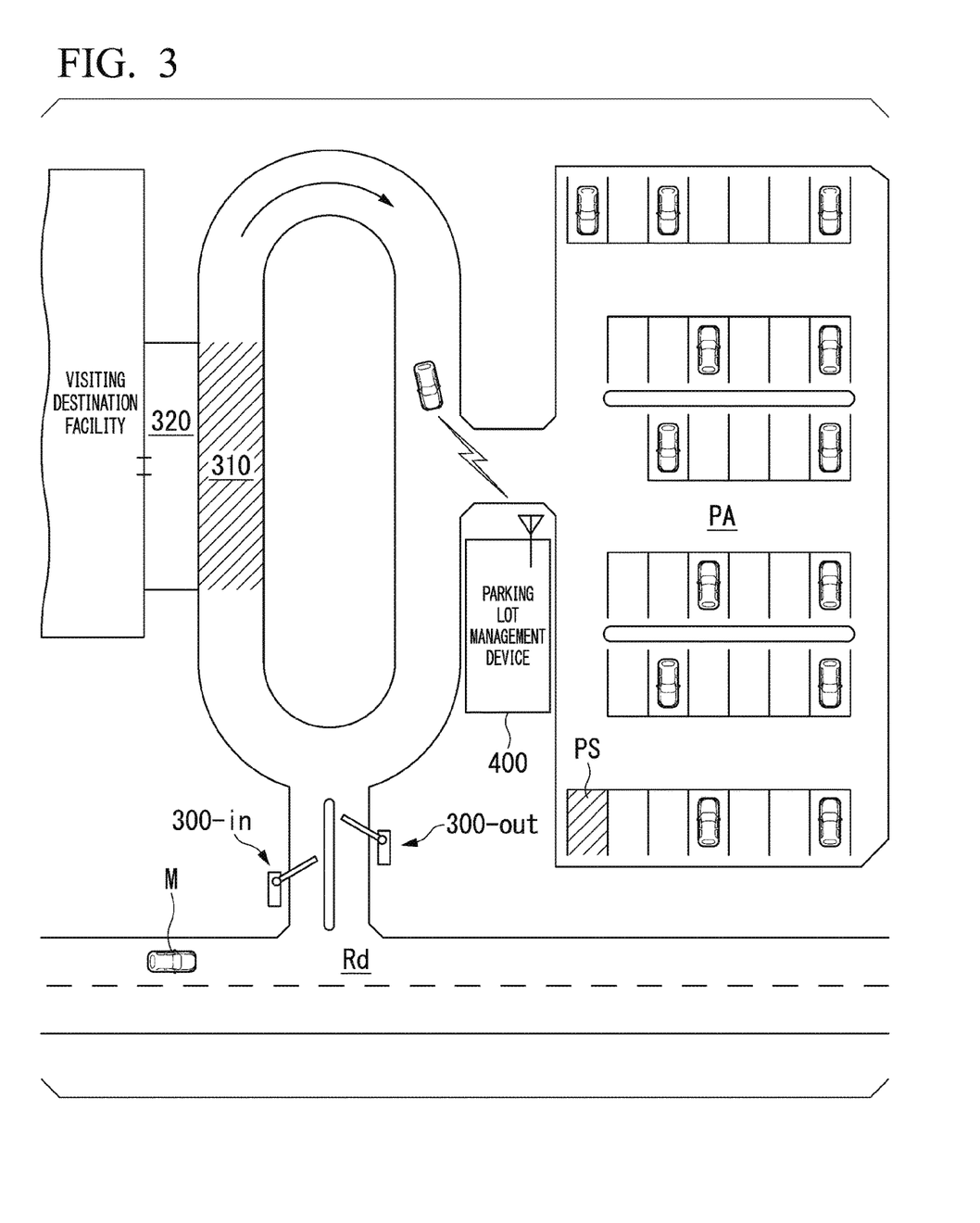
FIG. 3 is a diagram schematically showing a scene in which a self-traveling parking event is executed.

For example, the self-traveling parking controller 142 causes the host vehicle M to be parked within the parking space on the basis of information acquired from the parking lot management device 400 by the communication device 20. FIG. 3 is a diagram schematically showing a scene in which a self-traveling parking event is executed. Gates 300-in and 300-out are provided on a route from a road Rd to a visiting destination facility. The host vehicle M moves to the stopping area 310 through the gate 300-in according to manual driving or automated driving. The stopping area 310 faces a carriage-porch area 320 connected to the visiting destination facility. The carriage-porch area 320 is provided with eaves for avoiding rain and snow.

Figure 4:
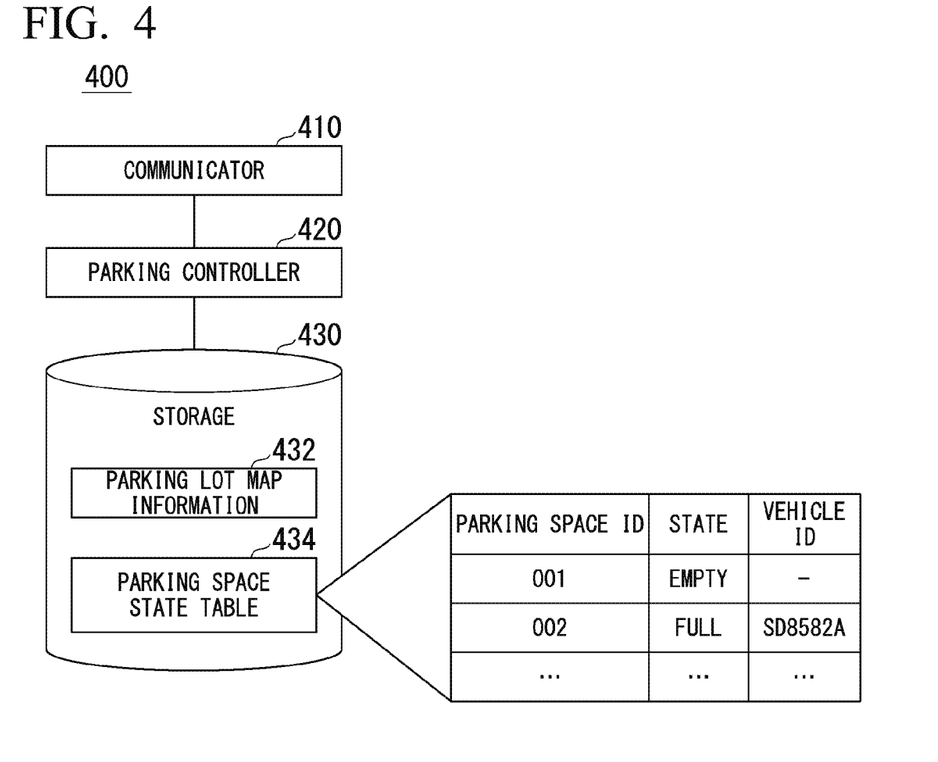
FIG. 4 is a diagram showing an example of a configuration of a parking lot management device.

After the occupant gets out of the host vehicle M in the stopping area 310, the host vehicle M performs unmanned automated driving and starts the self-traveling parking event in which the host vehicle M moves to a parking space PS within a parking area PA. For example, a start trigger of the self-traveling parking event may be, for example, any operation of the user or may be the wireless reception of a predetermined signal from the parking lot management device 400. The self-traveling parking controller 142 may cause a function that is not related to traveling in the predetermined device 230 to be stopped after the user gets out of the host vehicle M in the stopping area 310. When a self-traveling parking event starts, the self-traveling parking controller 142 controls the communication device 20 so that the communication device 20 transmits a parking request to the parking lot management device 400. The host vehicle M moves from the stopping area 310 to the first parking area PA in accordance with guidance of the parking lot management device 400 or while performing sensing by oneself. FIG. 4 is a diagram showing an example of the configuration of the parking lot management device 400. The parking lot management device 400 includes, for example, a communicator 410, a parking controller 420, and a storage 430. The storage 430 stores information such as parking lot map information 432 and a parking space state table 434.

The communicator 410 wirelessly communicates with the host vehicle M and other vehicles. The parking controller 420 guides the vehicle to the parking space PS on the basis of information acquired by the communicator 410 and information stored in the storage 430. The parking lot map information 432 is information geometrically indicating a structure of the parking area PA. The parking lot map information 432 includes coordinates for each parking space PS. In the parking space state table 434, for example, a state which is an empty state or a full (parked) state and a vehicle ID which is identification information of a vehicle during parking in the case of the full state are associated with a parking space ID that is identification information of the parking space PS.

When the communicator 410 receives a parking request from the vehicle, the parking controller 420 extracts the parking space PS whose state is the empty state with reference to the parking space state table 434, acquires a position of the extracted parking space PS from the parking lot map information 432, and transmits a suitable route to the acquired position of the parking space PS to the vehicle using the communicator 410. The parking controller 420 instructs a specific vehicle to stop or slow down as necessary so that the vehicles do not move to the same position at the same time on the basis of positional relationships of a plurality of vehicles.

In the vehicle (hereinafter referred to as the host vehicle M) receiving a route, the self-traveling parking controller 142 generates a target trajectory based on the route. When the host vehicle M approaches the target parking space PS, the parking space recognizer 134 recognizes parking frame lines that divide off the parking space PS and the like, recognizes a detailed position of the parking space PS, and provides the recognized position to the self-traveling parking controller 142. The self-traveling parking controller 142 receives the provided position to correct the target trajectory and cause the host vehicle M to be parked in the parking space PS.

The self-traveling parking controller 142 may find an empty parking space on the basis of a detection result of the camera 10, the radar device 12, the finder 14, or the physical object recognition device 16 independently of communication and cause the host vehicle M to be parked within the found parking space without being limited to the above description.

[Self-Traveling Parking Event-Time of Leaving]

The self-traveling parking controller 142 and the communication device 20 maintain the operation state even when the host vehicle M has been parked. For example, the self-traveling parking controller 142 causes the system of the host vehicle M to be activated and causes the host vehicle M to move to the stopping area 310 when the communication device 20 has received a pick-up request for moving the host vehicle M from the parking area PA and allowing the user to get into the host vehicle M in the stopping area 310 from the terminal device of the user. At this time, the self-traveling parking controller 142 controls the communication device 20 so that the communication device 20 transmits a start request to the parking lot management device 400. The parking controller 420 of the parking lot management device 400 instructs a specific vehicle to stop or slow down as necessary so that the vehicles do not move to the same position at the same time on the basis of positional relationships of a plurality of vehicles, as in the case of the time of entering. When the host vehicle M is moved to the stopping area 310 and the user is allowed to get into the host vehicle M, the self-traveling parking controller 142 stops the operation and manual driving or automated driving by another functional part is started subsequently. The self-traveling parking controller 142 may control the communication device 20 so that the terminal device of the user can be notified of information about a state or a position of the host vehicle M when the host vehicle M starts the movement to the stopping area 310 or has arrived at the stopping area 310. In the following description, a process in which the host vehicle M arrives at the stopping area 310 and the user gets into the host vehicle M as a result of the self-traveling parking event at the time of leaving may be referred to as the "next getting-into process".

The self-traveling parking controller 142 may find an empty parking space by itself on the basis of the detection result of the camera 10, the radar device 12, the finder 14, or the physical object recognition device 16 independently of communication and cause the host vehicle M to be parked in the found parking space without being limited to the above description. Likewise, at the time of leaving, the host vehicle M may be moved to the stopping area 310 by itself independently of communication.

[Reproduction of Operation State]

When the recognition result indicating that the user of the host vehicle M gets out of (or has got out of) the host vehicle M has been acquired from the recognizer 130, the reproducer 180 causes the operation state of the predetermined device 230 to be temporarily stored in the reproduction setting information 192. Furthermore, when the second controller 160 controls the host vehicle M so that the host vehicle M moves from the parking area PA to the stopping area 310 according to automated driving and picks up the user, the parking time controller 174 performs control so that the operation state of the predetermined device 230 is reproduced at a timing when the user will get into the host vehicle M the next time.

The "reproduction" may be a process of creating the operation state of the predetermined device 230 used by the user during a previous getting-into process or when the user has got out of the vehicle exactly as it is or may be a process of creating a state similar to the operation state of the predetermined device 230 at the time of a previous getting-out process. A state suitable for the user may be created on the basis of the operation state of the predetermined device 230 at the time of the previous getting-out process. The "reproduction" may include a process in which the predetermined device 230 which has not been used by the user during a previous getting-into process or when the user has got out of the vehicle or whose use has been stopped is not operated.

The parking time controller 174 adjusts an operation start timing of the predetermined device 230 so that the operation state of the predetermined device 230 is reproduced on the basis of a timing when the surrounding recognizer 132 recognizes that the user will get into the host vehicle M the next time. Although the operation start timing is mainly a timing when the user will get into the host vehicle M the next time (a timing when the door of the host vehicle M is opened), the operation of the predetermined device 230 may be started before the operation start timing.

Figure 5:
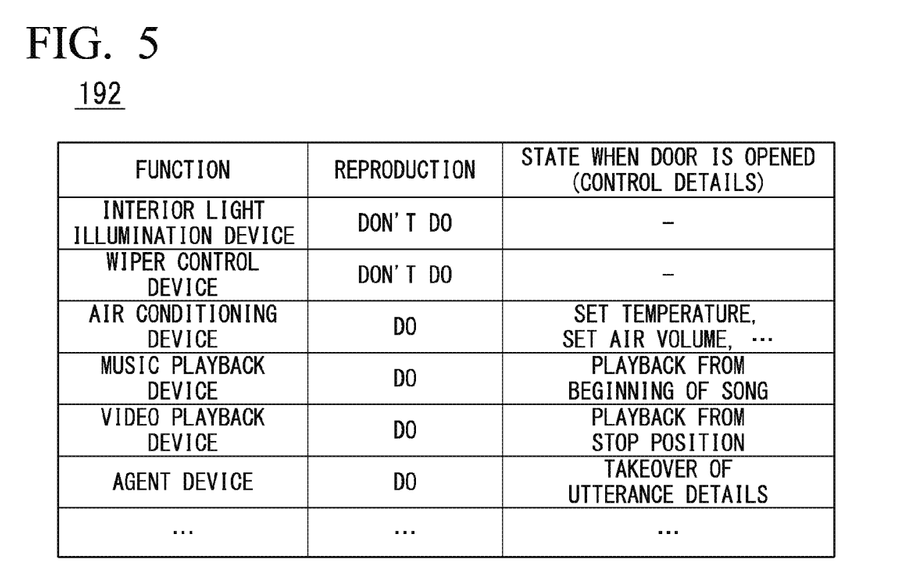
FIG. 5 is a diagram showing an example of reproduction setting information.

The parking time controller 174 reproduces the operation state of the predetermined device 230 with reference to the reproduction setting information 192. FIG. 5 is a diagram showing an example of the reproduction setting information 192. As in the example shown in FIG. 5, the reproduction setting information 192 is associated with settings of whether or not to cause each of predetermined devices 230 to reproduce an operation state, control details at the time of reproduction, and the like. These settings may be preset by a seller or an administrator when the host vehicle M is purchased or may be set by the user when the user gets into or out of the host vehicle M.

For example, when the predetermined device 230 includes the wiper device 233, the reproducer 180 determines that the wiper device 233 is not allowed to perform reproduction on the basis of the reproduction setting information 192 shown in FIG. 5. Likewise, when the predetermined device 230 includes the interior light illumination device 234, the reproducer 180 determines that the interior light illumination device 234 is not allowed to perform reproduction on the basis of the reproduction setting information 192 shown in FIG. 5. Similar to the wiper device 233 and the interior light illumination device 234, devices whose functions are automatically turned on/off on the basis of sensing results of sensors provided in the devices themselves and the like may be set so that reproduction by the parking time controller 174 is not required.

For example, when the predetermined device 230 includes any one of an air conditioning device 232, a music playback device 231-1, a video playback device 231-2, and an agent device 235, the reproducer 180 determines that reproduction is performed on the basis of the reproduction setting information 192 shown in FIG. 5. The parking time controller 174 determines control details of the predetermined device 230 on the basis of a state when the door is opened stored in the reproduction setting information 192.

[Control of Air Conditioning Device]

In a state in which the user has made various types of settings (a setting of a temperature, a setting of a wind direction, a setting of an air volume, a setting of humidity, a setting of deodorant fragrance spraying, a setting of an air cleaning function, and the like) for the air conditioning device 232, setting information set when the user gets out of the host vehicle M is temporarily stored as the reproduction setting information 192 when the user gets out of the vehicle M. When the acquirer 172 has acquired a reproduction start instruction from the reproducer 180, i.e., when the reproducer 180 has acquired a recognition result indicating that the user will get into the vehicle the next time and the reproduction start instruction has been output to the third controller 170, the parking time controller 174 presets a vehicle interior space in a comfortable state by adjusting an operation start timing and an operation condition of the air conditioning device so that an environment (a temperature, humidity, or the like) of the interior of the vehicle stored in the reproduction setting information 192 is implemented at a timing when the user will get into the vehicle the next time on the basis of the vehicle interior space information recognized by the surrounding recognizer 132 and the reproduction setting information 192.

For example, the reproducer 180 predicts a period of time until the user arriving at the carriage-porch area 320 gets into the vehicle on the basis of a position of the host vehicle M and a position of the carriage-porch area 320 at a timing when a pick-up request has been received. The reproducer 180 acquires information of a degree of deviation between the vehicle interior space information of the timing when the pick-up request has been received and the reproduction setting information 192 (a temperature difference between a set temperature and a current temperature or a humidity difference detected by a temperature/humidity sensor provided in the air conditioning device 232 or the like). For example, when the above-described degree of deviation is greater than or equal to a predetermined degree, the parking time controller 174 starts the operation of the air conditioning device 232 while the vehicle is moving to the stopping area 310 or performs control for strengthening or weakening a cooling function, a heating function, a humidity adjustment function, or the like. The parking time controller 174 determines the above-described degree of adjustment on the basis of a predicted period of time until the user gets into the vehicle. For example, when the temperature in the interior of the vehicle at the timing when the pick-up request has been received is 35° C. and the temperature in the interior of the vehicle stored in the reproduction setting information 192 is 28° C., the parking time controller 174 operates the air conditioning device 232 immediately after the pick-up request is received and adjusts the operation state so that the temperature in the interior of the vehicle is 28° C. when the vehicle has arrived at the carriage-porch area 320. The parking time controller 174 controls the air conditioning device 232 so that the degree of deviation between the vehicle interior space information and the reproduction setting information 192 is eliminated according to such adjustment.

[Control of Content Playback Device]

When the target function of the predetermined device 230 is, for example, the content playback device 231, the parking time controller 174 reproduces a playback state by playing the music or video that was being played when the user got out of the host vehicle M from a stop position thereof. The parking time controller 174 reproduces a playback state by causing information of the operation state including the stop position of the music or video to be temporarily stored in the reproduction setting information 192 and causing playback to be resumed from the stop position at a timing when the user will get into the host vehicle M the next time (for example, a timing when a door of the host vehicle M is opened).

The parking time controller 174 may play the content information that was being played when the user got out of the vehicle so that the content information is played from the beginning (for example, a playback position where there is a reasonable pause in a song or a story). At the timing when the door of the host vehicle M is opened so that the user gets into the host vehicle M, the user can select whether to cause the content playback device 231 to play the content from the stop position of the content at an end timepoint of a previous getting-into process or to play the content that was being played at an end timepoint of a previous getting-into process from the beginning and the parking time controller 174 determines the playback position in accordance with a selection result thereof. Reproducing the playback of the content may include resuming the playback of the content information from a playback position that is a predetermined period of time (for example, about 10 to 20 [s]) earlier than a stop position at a previous getting-out time. At this time, how far back the playback of content information is resumed from a playback position may be adjusted according to an estimated period of time from the time when the door of the host vehicle M is opened to the time when the host vehicle M starts moving or may be preset by an occupant user.

The reproducer 180 can acquire information for identifying a user to be picked up through the surrounding recognizer 132 or the communication device 20 and may not reproduce the playback state of the content playback device 231 based on the reproduction setting information 192 as described above when a user different from the user who got out of the vehicle last time gets into the vehicle.

[Control of Agent Device]

For example, when a target function of the predetermined device 230 is the agent device 235, the parking time controller 174 reproduces the operation state by taking over a voice conversation record with the user (utterance details of the agent) and a conversation record between users. For example, when a request such as "Look for a restaurant near here." has been made by the user at the time of a previous getting-into process, the agent device 235 provides a result of a response to the request. When a request such as "Remind me to move luggage in the trunk at the time of the next getting-into process." has been made by the user at the time of a previous getting-into process, reminder information thereof is provided. When a continuous conversation with the user was in progress at the time of the previous getting-into process (for example, before the user makes an answer after the agent provides a quiz question or when the agent and the user were in conversation with each other), the continuation of the conversation may be resumed. In this case, the parking time controller 174 may ask a question such as "Do you wish to resume the previous conversation that was in progress?" to the user and determine whether or not to resume the conversation in accordance with a response result.

[Processing Flow]

Figure 6:
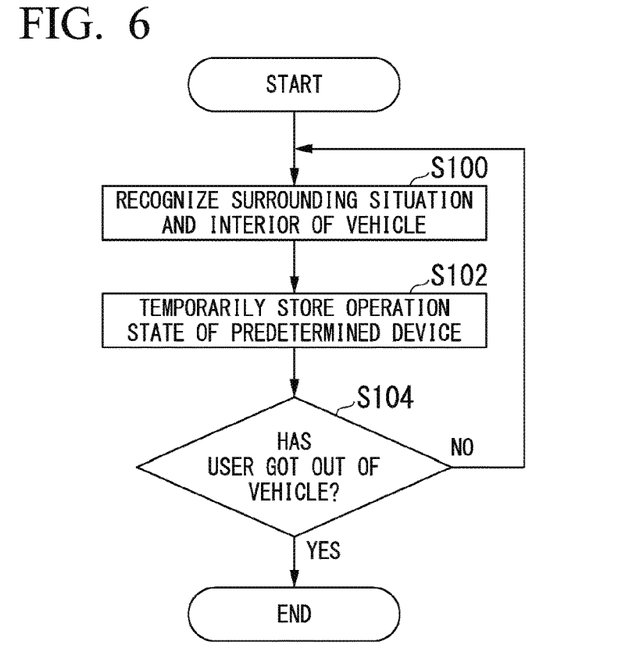
FIG. 6 is a flowchart showing an example of a flow of a series of processes when a user gets out of a vehicle in the vehicle control system according to the embodiment.
Figure 7:
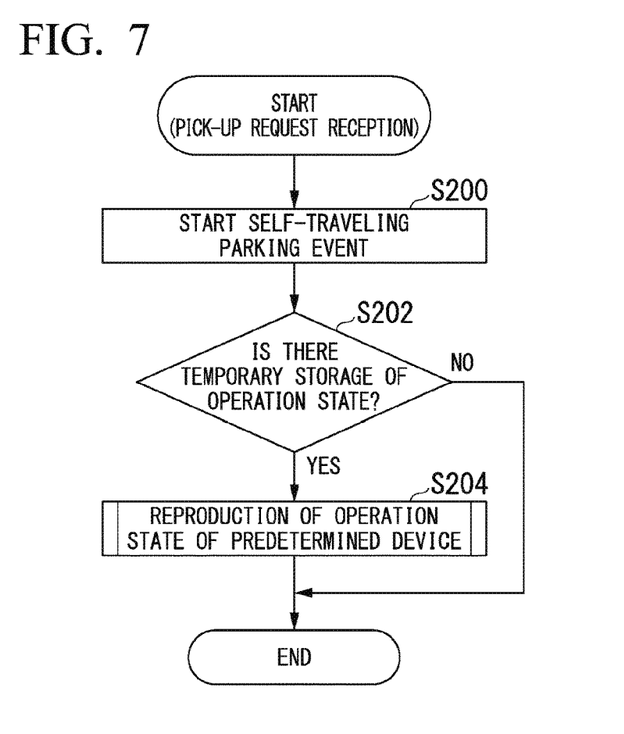
FIG. 7 is a flowchart showing an example of a flow of a series of processes when the user gets into the vehicle again in a vehicle control system 1 according to the embodiment.

Hereinafter, a flow of a series of processes by the vehicle control system 1 according to the embodiment will be described using a flowchart. FIGS. 6 and 7 are flowcharts showing an example of a flow of a series of processes in the vehicle control system 1 according to the embodiment.

FIG. 6 is a flowchart showing an example of a flow of a series of processes when the user gets out of the vehicle in the vehicle control system 1 according to the embodiment.

First, the surrounding recognizer 132 recognizes a surrounding situation of a vehicle (step S100). Next, the reproducer 180 temporarily stores an operation state of the predetermined device 230 as reproduction setting information 192 (step S102). Next, the surrounding recognizer 132 determines whether or not the user of the host vehicle M has got out of the host vehicle M (step S104). When it is determined that the user has not got out of the vehicle, the surrounding recognizer 132 performs the processing of step S100 again when a fixed period of time has elapsed. When it is determined that the user has got out of the vehicle, the process of the present flowchart ends.

As shown in the above-described flowchart, the reproducer 180 causes the operation state when the user has got out of the vehicle to be temporary stored in the reproduction setting information 192 by iteratively performing the processing of steps S100 to S104 until the user gets out of the vehicle.

FIG. 7 is a flowchart showing an example of a flow of a series of processes when the user gets into the vehicle the next time in the vehicle control system 1 according to the embodiment.

First, the self-traveling parking controller 142 receives a pick-up request and starts a self-traveling parking event at the time of leaving (step S200). Next, the reproducer 180 determines whether or not an operation state of the predetermined device 230 has been stored in the reproduction setting information 192 (step S202). When it is determined that the operation state has been stored, the reproducer 180 causes the third controller 170 to reproduce the operation state by controlling the operation of the predetermined device 230 on the basis of the reproduction setting information 192 (step S204). If it is determined that the operation state has not been temporarily stored, the process of the present flowchart ends.

In the processing of step S202 in FIG. 7, the determination of whether or not a user who got out of the vehicle last time is the same as a user who gets out of the vehicle this time may be made. In this case, for example, when the users are not the same, it is determined that there is no temporary storage of the operation state.

Figure 8:
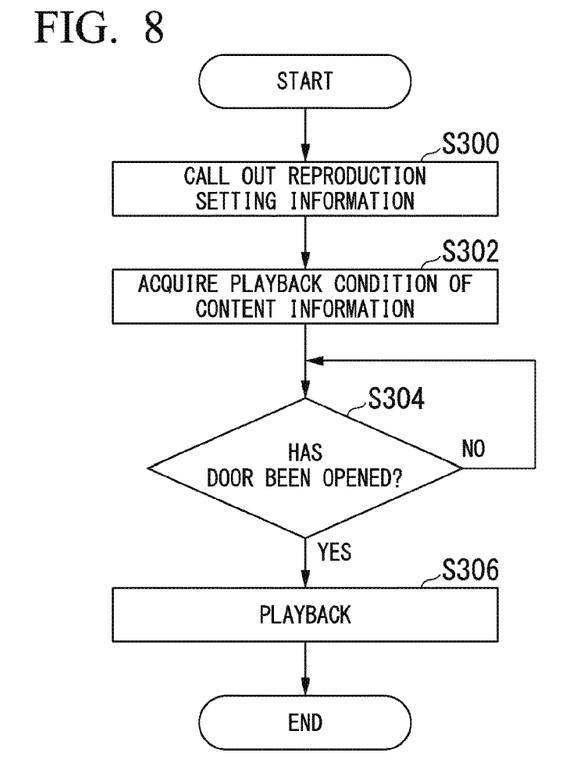
FIG. 8 is a flowchart showing an example of a flow of an operation state reproduction process when a content playback device is included in a predetermined device.
Figure 9:
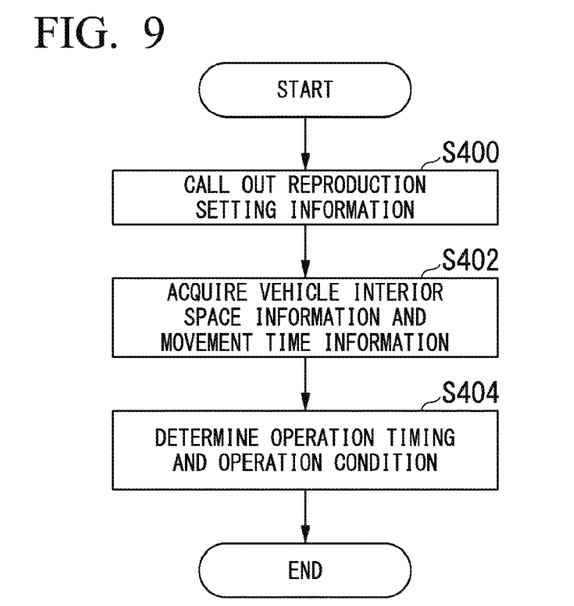
FIG. 9 is a flowchart showing an example of a flow of an operation state reproduction process when an air conditioning device is included in the predetermined device.
Figure 10:
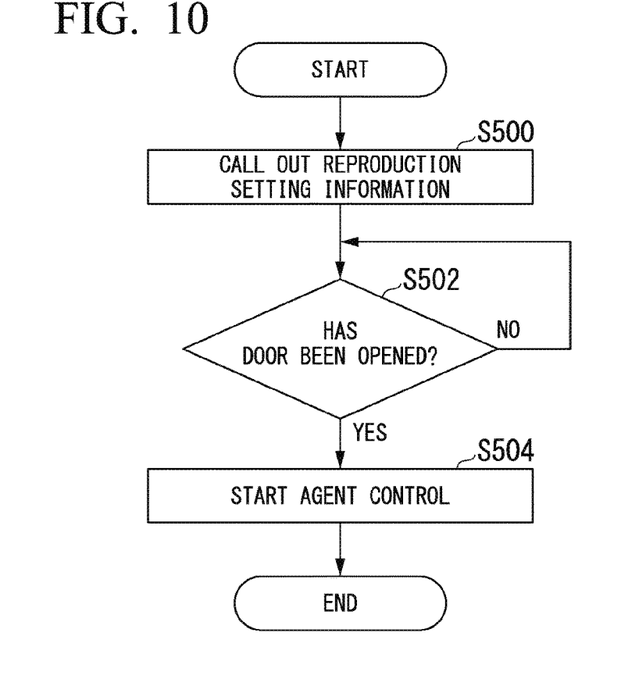
FIG. 10 is a flowchart showing an example of a flow of an operation state reproduction process when an agent device is included in the predetermined device.

FIGS. 8 to 10 are flowcharts showing an example of a flow of a process of reproducing the operation state of the predetermined device 230. FIGS. 8 to 10 correspond to the processing of step S204 of the flowchart shown in FIG. 7.

FIG. 8 is a flowchart showing an example of a flow of an operation state reproduction process when the content playback device 231 is included in the predetermined device 230.

First, the reproducer 180 calls out temporary storage of the operation state of the content playback device 231 stored in the reproduction setting information 192 (step S300). Next, the parking time controller 174 acquires a playback condition of the content playback device 231 that is the predetermined device 230 from the reproduction setting information 192 (whether to play content information from the beginning or whether to resume playback from a temporarily stored stop position of the content information) (step S302).

Next, the surrounding recognizer 132 determines whether or not the door of the host vehicle M has been opened (step S304). When it is determined that the door has not been opened, the surrounding recognizer 132 performs the processing of step S304 again when a predetermined period of time has elapsed. When it is determined that the door has been opened, the acquirer 172 acquires a recognition result of the surrounding recognizer 132 and outputs an acquisition result to the parking time controller 174, and the parking time controller 174 causes the content playback device 231 to play content information as determined in step S302 (step S306). When playback is resumed from the temporarily stored stop position of the content information in step S306, the parking time controller 174 may resume the playback of the content information from a playback position that is a predetermined period of time earlier than a stop position at the time of a previous getting-out process. Accordingly, the description of the process in the present flowchart ends.

FIG. 9 is a flowchart showing an example of a flow of an operation state reproduction process when the air conditioning device 232 is included in the predetermined device 230.

First, the reproducer 180 calls out temporary storage of an operation state of the air conditioning device 232 stored in the reproduction setting information 192 (step S400). Next, the acquirer 172 acquires vehicle interior space information such as a temperature and humidity in the interior of the vehicle recognized by the surrounding recognizer 132 and a movement time of the host vehicle M until the user gets into the host vehicle M (step S402) and performs air conditioning control on the basis of various types of information that has been acquired (step S404). Accordingly, the description of the process of the present flowchart ends.

FIG. 10 is a flowchart showing an example of a flow of an operation state reproduction process when the agent device 235 is included in the predetermined device 230.

First, the reproducer 180 calls out temporary storage of the operation state of the agent device 235 stored in the reproduction setting information 192 (step S500). Next, the surrounding recognizer 132 determines whether the door of the vehicle M has been opened (step S502). When it is determined that the door has not been opened, the surrounding recognizer 132 performs the processing of step S502 again when a predetermined period of time has elapsed. When it is determined that the door has been opened, the acquirer 172 acquires a recognition result obtained through recognition of the surrounding recognizer 132 and the parking time controller 174 causes an agent function of the agent device 235 to be started on the basis of a result acquired by the acquirer 172 (step S504). Accordingly, the description of the process of the present flowchart ends.

According to the embodiment described above, there are provided the recognizer 130 configured to recognize a surrounding situation of the host vehicle M; the reproducer 180 configured to reproduce an operation state of the predetermined device 230 that provides a comfortable environment of the host vehicle M; and the third controller 170 configured to control an operation of the predetermined device 230 that provides the comfortable environment of the host vehicle M, wherein the reproducer 180 causes the operation state of the predetermined device 230 to be stored in the reproduction setting information 192 when the recognizer 130 recognizes that a user gets out of the host vehicle M and the reproducer 180 causes the third controller 170 to reproduce the operation state of the predetermined device stored in the reproduction setting information 192 when the recognizer 130 recognizes that the user will gets into the host vehicle M the next time, so that suitable control of the comfortable environment can be implemented in accordance with a situation of the user and the satisfaction of the user can be improved.

[Hardware Configuration]

Figure 11:
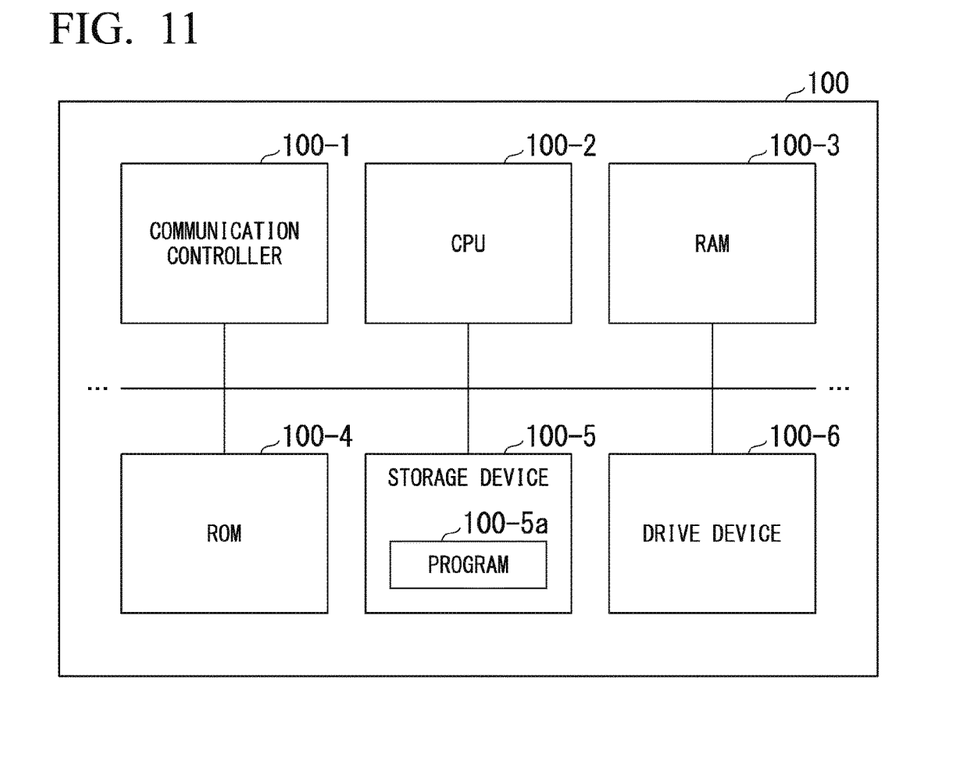
FIG. 11 is a diagram showing an example of a hardware configuration of an automated driving controller according to the embodiment.

FIG. 11 is a diagram showing an example of a hardware configuration of the automated driving controller 100 of the embodiment. As shown in FIG. 11, the automated driving controller 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving controller 100. The storage device 100-5 stores the program 100-5a to be executed by the CPU 100-2. This program is loaded to the RAM 100-3 by a direct memory access (DMA) controller (not shown) or the like and executed by the CPU 100-2. Thereby, some or all of the first controller 120, the second controller 160, the third controller 170, and the reproducer180 are implemented.

The embodiment described above can be represented as follows.

A vehicle control device including:
a storage device configured to store a program; and
a hardware processor,
wherein the hardware processor executes the program stored in the storage device to:
recognize a surrounding situation of a vehicle;
perform driving control on at least one of steering and a speed of the vehicle on the basis of a recognition result;
control an operation of a predetermined device for providing a comfortable environment of the vehicle and limit an operation state of the predetermined device at a timing when a user gets out of the vehicle; and
reproduce the operation state of the predetermined device at a timing when the user gets into the vehicle if driving control for moving the vehicle from a parking area and picking up the user is performed.

Although modes for carrying out the present invention have been described using embodiments, the present invention is not limited to the embodiments, and various modifications and substitutions can also be made without departing from the scope and spirit of the present invention.

Although an example in which the host vehicle M autonomously enters a parking lot or leaves the parking lot for a pick-up in the above-described embodiment has been described in the above-described embodiment, a driver among users may perform driving of entering or leaving. In this case, the third controller 170 may perform control so that the operation state of the predetermined device 230 at a timing when the driver gets out of the vehicle is reproduced. When a plurality of users get into and out of the host vehicle M and getting-into/out timings of the users are different (for example, when the driver allows another user to get out of the vehicle in the carriage-porch area 320), the operation state of the predetermined device 230 may be reproduced using a user first getting out of the vehicle in the carriage-porch area 320 as a reference of reproduction or the operation state of the predetermined device 230 may be reproduced using a timing when a driver gets out of the vehicle in the parking lot after another user first gets out of the vehicle as a reference of reproduction. The reproducer 180 may cause the operation state to be reproduced when it is estimated that the user gets into the vehicle or it is recognized that the user gets into the vehicle when the user reproducing content is recognized. For example, the reproducer 180 receives a setting indicating which user's operation state of the predetermined device 230 is reproduced via the HMI 30 or the like in advance and causes the third controller 170 to reproduce the operating state in accordance with the setting thereof.

When a user different from a user who got out of the vehicle last time gets into the vehicle, the reproducer 180 may not perform the reproduction also in the case of the predetermined device 230 other than the content playback device 231 as described above. For example, when a user different from a user who got out of the vehicle last time gets into the vehicle, the reproducer 180 determines settings of the air conditioning device 232 and the agent device 235 among the predetermined devices 230 as standard settings preset by an owner of the host vehicle M or the like (default settings).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a processor that executes instructions to:
recognize a surrounding situation of a vehicle;
perform driving control on at least one of steering or a speed of the vehicle based on a recognition result;

control an operation of a predetermined device for providing a comfortable environment of the vehicle and limit an operation state of the predetermined device at a timing when a user gets out of the vehicle; and reproduce the operation state of the predetermined device at a timing when the user gets into the vehicle when performing driving control for moving the vehicle from a parking area and picking up the user, wherein the predetermined device is an agent device with an artificial intelligence function, and if a continuous voice conversation between the user and the agent device was terminated in the middle of the voice conversation at the timing when the user gets out of the vehicle, the processor starts control of the agent device in response to detecting that a door of the vehicle is opened for the user to get into the vehicle, notifies the user that the voice conversation was in progress at the timing when the user gets into the vehicle, generates a query as to whether the voice conversation should be taken over to reproduce the operation state, and controls the operation state of the predetermined device based on a response to the query.

2. The vehicle control system according to claim 1, wherein the processor further executes instructions to:

acquire the recognition result indicating that the user gets into the vehicle, in response to acquiring the recognition result indicating that the user gets into the vehicle, determine that the processor performs a process of moving the vehicle from a parking area and picking up the user and instruct the processor to reproduce the operation state of the agent device at the timing when the user gets into the vehicle.

3. The vehicle control system according to claim 1, wherein the processor reproduces the operation state of the agent device used by the user while the user was in the vehicle.

4. The vehicle control system according to claim 3, wherein the processor does not reproduce the operation state of the agent device which was not used by the user while the user was in the vehicle or whose use was stopped while the user was in the vehicle.

5. The vehicle control system according to claim 4, wherein the processor adjusts an operation start timing of the agent device so that the operation state of the agent device is reproduced at a timing when the processor recognizes that the user gets into the vehicle.

6. The vehicle control system according to claim 1, wherein the processor is configured to acquire information for identifying a user and does not reproduce the operation state of the agent device if a first user to be picked up for which the information has been acquired is different from a second user getting out of the vehicle at a timing when the operation state of the agent device has been limited.

7. A vehicle control method comprising:

recognizing, by a vehicle control device, a surrounding situation of a vehicle;

performing, by the vehicle control device, driving control on at least one of steering or a speed of the vehicle based on a result of the recognizing;

controlling, by the vehicle control device, an operation of a predetermined device for providing a comfortable environment of the vehicle and limiting an operation state of the predetermined device at a timing when a user gets out of the vehicle, wherein the predetermined device is an agent device with an artificial intelligence function; and reproducing, by the vehicle control device, the operation state of the predetermined device at a timing when the user gets into the vehicle if driving control for moving the vehicle from a parking area and picking up the user is performed, wherein the reproducing comprises:

if a continuous voice conversation between the user and the agent device was terminated in the middle of the voice conversation at the timing when the user gets out of the vehicle, starting control of the agent device in response to determining that a door of the vehicle is opened for the user to get into the vehicle, notifying the user that the voice conversation was in progress at the timing when the user gets into the vehicle, generating a query as to whether the voice conversation should be taken over to reproduce the operation state, and controlling the operation state of the predetermined device based on a response to the query.

8. A computer-readable non-transitory storage medium storing a program for causing a vehicle control device to perform operations, the operations comprising:

recognizing a surrounding situation of a vehicle;

performing driving control on at least one of steering or a speed of the vehicle based on a result of the recognizing;

controlling an operation of a predetermined device for providing a comfortable environment of the vehicle and limit an operation state of the predetermined device at a timing when a user gets out of the vehicle, wherein the predetermined device is an agent device with an artificial intelligence function; and reproducing the operation state of the predetermined device at a timing when the user gets into the vehicle if driving control for moving the vehicle from a parking area and picking up the user is performed, wherein the reproducing comprises:

if the voice conversation between the user and the agent device was terminated in the middle of a continuous voice conversation at the timing when the user gets out of the vehicle, starting control of the agent device in response to determining that a door of the vehicle is opened for the user to get into the vehicle, notifying the user that the voice conversation was in progress at the timing when the user gets into the vehicle, outputting a query as to whether the voice conversation should be taken over to reproduce the operation state, and controlling the operation state of the predetermined device based on a response to the query.

* * * * *